(12) United States Patent
Liu

(10) Patent No.: US 8,724,062 B2
(45) Date of Patent: May 13, 2014

(54) COMMON REPAIR STRUCTURES FOR CLOSE BUS IN A LIQUID CRYSTAL DISPLAY

(75) Inventor: Chien-Hung Liu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 81 days.

(21) Appl. No.: 13/549,798

(22) Filed: Jul. 16, 2012

(65) Prior Publication Data

US 2012/0274870 A1    Nov. 1, 2012

Related U.S. Application Data

(63) Continuation of application No. 12/616,420, filed on Nov. 11, 2009, now Pat. No. 8,264,631.

(51) Int. Cl.
*G02F 1/1337*    (2006.01)
*G02F 1/1362*    (2006.01)

(52) U.S. Cl.
CPC ............... *G02F 1/136259* (2013.01)
USPC ....................................... 349/129

(58) Field of Classification Search
None
See application file for complete search history.

(56) References Cited

U.S. PATENT DOCUMENTS

| 5,086,347 | A | 2/1992 | Ukai et al. |
| 5,303,074 | A | 4/1994 | Salisbury |
| 5,976,978 | A | 11/1999 | Salisbury |
| 7,248,319 | B2 * | 7/2007 | Liu et al. ............. 349/129 |
| 7,291,860 | B2 | 11/2007 | Jung et al. |
| 7,365,825 | B2 | 4/2008 | Kim |
| 2001/0035920 | A1 | 11/2001 | Choi |
| 2004/0016925 | A1 | 1/2004 | Watamura |
| 2005/0110736 | A1 | 5/2005 | Jinno |
| 2006/0012728 | A1 | 1/2006 | Watamura |
| 2006/0176415 | A1 | 8/2006 | Watamura |
| 2010/0265424 | A1 | 10/2010 | Chiu et al. |

FOREIGN PATENT DOCUMENTS

| CN | 101446724 A | 6/2009 |
| EP | 0373586 A2 | 6/1990 |

* cited by examiner

*Primary Examiner* — Eric Wong
(74) *Attorney, Agent, or Firm* — Morris Manning & Martin, LLP; Tim Tingkang Xia, Esq.

(57) ABSTRACT

One aspect of the present disclosure relates to a common repair structure for repairing scanning and/or data line defects in a liquid crystal display panel. In one embodiment, the common repair structure includes a plurality of "H" shaped structures, where each "H" shaped structure is placed over a corresponding segment of two neighboring scanning lines located between and associated with two neighboring pixels along the second direction or a corresponding segment of two neighboring data lines located between and associated with two neighboring pixels along the first direction.

3 Claims, 11 Drawing Sheets

COMMON REPAIR STRUCTURES FOR CLOSE BUS IN A LIQUID CRYSTAL DISPLAY

CROSS-REFERENCE TO RELATED PATENT APPLICATION

This application is a continuation application of, and claims benefit of U.S. patent application Ser. No. 12/616,420, filed Nov. 11, 2009, entitled "COMMON REPAIR STRUCTURES FOR CLOSE BUS IN A LIQUID CRYSTAL DISPLAY," by Chien-Hung Liu, which is hereby incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

TECHNICAL FIELD

The present disclosure relates generally to a liquid crystal display (LCD) panel, and more particularly, to a repair structure for scanning line and/or data line defects in an LCD panel, which dramatically reduces the parasitic capacitance therein.

BACKGROUND OF THE DISCLOSURE

Liquid crystal display (LCD) is commonly used as a display device because of its capability of displaying images with good quality while using little power. An LCD apparatus includes an LCD panel formed with liquid crystal cells and pixel elements with each associating with a corresponding liquid crystal cell and having a liquid crystal capacitor and a storage capacitor, a thin film transistor (TFT) electrically coupled with the liquid crystal capacitor and the storage capacitor. These pixel elements are substantially arranged in the form of a matrix having a number of pixel rows and a number of pixel columns. Typically, scanning signals are sequentially applied to the number of pixel rows, through a plurality of scanning lines along the row direction, for sequentially turning on the pixel elements row-by-row. When a scanning signal is applied to a pixel row to turn on corresponding TFTs of the pixel elements of a pixel row, source signals (image signals) for the pixel row are simultaneously applied to the number of pixel columns, through a plurality of data lines arranged crossing over the plurality of scanning lines along the column direction, so as to charge the corresponding liquid crystal capacitor and storage capacitor of the pixel row for aligning orientations of the corresponding liquid crystal cells associated with the pixel row to control light transmittance therethrough. By repeating the procedure for all pixel rows, all pixel elements are supplied with corresponding source signals of the image signal, thereby displaying the image signal thereon.

Occasionally, manufacturing defects may occur in an LCD panel. The defects include, (1) one or more scanning lines are broken, (2) one or more data lines are broken, and (3) one or more scanning lines are short circuited with one or more data lines. A defect on a scanning or data line can adversely affect overall performance of the LCD device. For example, if an open circuit condition occurs in a LCD panel, the active components connected to the line beyond the point where the open circuit exists is disabled. A short circuit between a data and a scanning line can also lead to inaccurate signals being applied to all switching transistors connected to either of the shorted data or scanning lines. In either case, multiple pixels in the device can be affected, thereby significantly diminishing its display quality. A device having such defective scanning lines or data lines may have to be discarded, depending upon the degradation of the resolution of the display device resulting from the inoperative pixels resulting.

Given the expense of fabricating LCD devices, it is desirable to have devices that are repairable after they have been assembled. In one common approach, a thin film display device has a plurality of auxiliary conductive lines disposed across the scanning lines or data lines on the sides of the device, usually, outside the active areas of the device.

U.S. Pat. No. 5,086,347 to Ukai et al. discloses a repair method for an LCD device. As shown in FIG. 1, a plurality of repair conductive layers 41 is provided opposite of a scanning lines 18 across an insulating layer (not shown), and a plurality of repair conductive layer 42 is provided opposite of a data line 19 across the insulating layer (not shown). When any one of the scanning lines or data lines is broken, a repair conductive layer and the broken line can be connected by at both side of the broken portion by laser welding, where the welding points are indicated as "x" in FIG. 1. The problem with this method is that once a conductive layer is used to repair a given line, however, it cannot be used for repairing of any other lines. Moreover, if one or more scanning lines or data lines are open at a crossover of a scanning line and a data line, this type of the defects may not be repaired using the method. Additionally, due to the special relation of the conductive repair layers 41, and 42 and the scanning line 18 and the data line 19, parasitic capacitances may be induced by the conductive repair layers 41, and 42. A parasitic capacitance may cause a DC voltage offset to an AC voltage applied to liquid crystal layer, thereby generating flicker, crosstalk, and non-uniformity of luminance in the images.

Therefore, a heretofore unaddressed need exists in the art to address the aforementioned deficiencies and inadequacies.

SUMMARY OF THE DISCLOSURE

The present disclosure, in one aspect, relates to a common repair structure for repairing scanning line and/or data line defects in an LCD panel. The LCD panel comprises a plurality of scanning lines arranged in a first direction, a plurality of data lines arranged crossing over the plurality of scanning lines in a second direction substantially interlaced (such as perpendicular) to the first direction, thereby defining a plurality of crossovers therebetween, and a plurality of pixels associated with the plurality of scanning lines and data lines.

In one embodiment, the common repair structure includes a plurality of first "H" shaped structures, where each first "H" shaped structure has a first strip, a second strip, and a third strip connected to and between the first and second strips, each of the first and second strips having a first end portion and an opposite, second end portion, and is placed over a corresponding segment of two scanning lines located between and associated with two pixels along the second direction such that the first end portions of the first and second strips overlap with one of the two scanning lines, while the second end portions of the first and second strips overlap with the other of the two scanning lines, where each first "H" shaped structure is connectable selectively to one of the two scanning lines in the corresponding segment.

In one embodiment, the plurality of first "H" shaped structures is insulated from the plurality of scanning lines. When a defect is detected in a scanning line in the corresponding segment, the first "H" shaped structure is electrically connected to the defected scanning line in the corresponding segment by laser welding corresponding end portions of the first and second strips to the defected scanning line, and where the corresponding end portions of the first and second strips overlap with the defected scanning line and are the first end portions of the first and second strips or the second end portions of the first and second strips.

Further, the common repair structure includes a plurality of second "H" shaped structures, where each second "H" shaped structure has a first strip, a second strip, and a third strip connected to and between the first and second strips, each of the first and second strips having a first end portion and an opposite, second end portion, and is placed over an individual segment of two data lines located between and associated with two pixels along the first direction such that the first end portions of the first and second strips overlap with one of the two data lines, while the second end portions of the first and second strips overlap with the other of the two data lines, where each second "H" shaped structure is connectable selectively to one of the two data lines in the corresponding segment.

In one embodiment, the plurality of second "H" shaped structures is insulated from the plurality of data lines. When a defect is detected in a data line in the corresponding segment, the second "H" shaped structure is electrically connected to the defected data line in the corresponding segment by laser welding corresponding end portions of the first and second strips to the defected data line, and where the corresponding end portions of the first and second strips overlap with the defected data line and are the first end portions of the first and second strips or the second end portions of the first and second strips.

Additionally, the common repair structure further includes a plurality of "+" shaped structures, where each "+" shaped structure has a first strip and a second strip transversely extending from the first strip, each of the first and second strips having a first end portion and an opposite, second end portion, and is placed over a corresponding crossover and associated with two first "H" shaped structures and two second "H" shaped structures that are immediately adjacent to the corresponding crossover, and where each "+" shaped structure is connectable selectively to one of two first "H" shaped structures and two second "H" shaped structures that are immediately adjacent to the corresponding crossover. The first and second end portions of the first strip of the "+" shaped structure respectively overlap with the second strip of one of the two first "H" shaped structures and the first strip of the other of the two first "H" shaped structures, and the first and second end portions of the second strip of the "+" shaped structure respectively overlap with the second strip of one of the two second "H" shaped structures and the first strip of the other of the two second "H" shaped structures.

In one embodiment, the plurality of "+" shaped structures is insulated from the plurality of scanning lines, the plurality of first "H" shaped structures, the plurality of data lines and the plurality of second "H" shaped structures. When a defect is detected in a scanning line in the corresponding crossover, the "+" shaped structure is electrically connected to the defected scanning line in the corresponding crossover by laser welding the first and second end portions of the first strips to the overlapped second strip of one of the two first "H" shaped structures and the overlapped first strip of the other of the two first "H" shaped structures, respectively. When a defect is detected in a data line in the corresponding crossover, the "+" shaped structure is electrically connected to the defected data line in the corresponding crossover by laser welding the first and second end portions of the second strips to the overlapped second strip of one of the two second "H" shaped structures and the overlapped first strip of the other of the two second "H" shaped structures, respectively.

In one embodiment, each of the plurality of first "H" shaped structures, the plurality of second "H" shaped structures, and the plurality of "+" shaped structures is formed of an electrically conductive material.

In another aspect, the present disclosure relates to a common repair structure for repairing scanning line and/or data line defects in an LCD panel. The LCD panel comprises a plurality of scanning lines arranged in a first direction, a plurality of data lines arranged crossing over the plurality of scanning lines in a second direction substantially interlaced (such as perpendicular) to the first direction, thereby defining a plurality of crossovers therebetween, and a plurality of pixels associated with the plurality of scanning lines and data lines.

In one embodiment, the common repair structure includes a plurality of first "H" shaped structures, where each of the first "H" shaped structures is placed over a corresponding segment of two neighboring scanning lines located between and associated with two neighboring pixels along the second direction; a plurality of second "H" shaped structures, where each of the first "H" shaped structures is placed over a corresponding segment of two neighboring data lines located between and associated with two neighboring pixels along the first direction.

Additionally, the common repair structure further includes a plurality of "+" shaped structures, where each of the plurality of the "+" shaped structures is placed over a corresponding crossover and associated with two first "H" shaped structures and two second "H" shaped structures that are immediately adjacent to the corresponding crossover.

When a defect is detected in a scanning line in the corresponding segment, the first "H" shaped structure is electrically connected to the defected scanning line in the corresponding segment by laser welding. When a defect is detected in a data line in the corresponding segment, the second "H" shaped structure is electrically connected to the defected data line in the corresponding segment by laser welding. When a defect is detected in a scanning line in the corresponding crossover, the "+" shaped structure is electrically connected to the defected scanning line in the corresponding crossover by laser welding the "+" shaped structure to the two first "H" shaped structures that are immediately adjacent to the corresponding crossover. When a defect is detected in a data line in the corresponding crossover, the "+" shaped structure is electrically connected to the defected data line in the corresponding crossover by laser welding the "+" shaped structure to the two second "H" shaped structures that are immediately adjacent to the corresponding crossover.

In yet another aspect, the present disclosure relates to a method for repairing scanning line and/or data line defects in an LCD panel. The LCD panel comprises a plurality of scanning lines arranged in a first direction, a plurality of data lines arranged crossing over the plurality of scanning lines in a second direction substantially interlaced (such as perpendicular) to the first direction, thereby defining a plurality of crossovers therebetween, and a plurality of pixels associated with the plurality of scanning lines and data lines. In one embodiment, the method comprises the steps of proving a plurality of first "H" shaped structures, where each of the first "H" shaped structures is placed over a corresponding segment of two neighboring scanning lines located between and associated with two neighboring pixels along the second direction; proving a plurality of second "H" shaped structures, where each of the first "H" shaped structures is placed over a corresponding segment of two neighboring data lines located between and associated with two neighboring pixels along the first direction; detecting a defect in a segment; and laser welding one of plurality of first "H" shaped structures, the plurality of first "H" shaped structures, the plurality of "+" shaped structures to the defect scanning and/or data lines where the defects are detected.

In a further aspect, the present disclosure relates to a method for repairing scanning line and/or data line defects in an LCD panel. In one embodiment, the method comprises the steps of proving a plurality of first "H" shaped structures, where each of the first "H" shaped structures is placed over a corresponding segment of two neighboring scanning lines located between and associated with two neighboring pixels along the second direction, and proving a plurality of second "H" shaped structures, where each of the first "H" shaped structures is placed over a corresponding segment of two neighboring data lines located between and associated with two neighboring pixels along the first direction.

The method also includes the step of laser welding one of plurality of first "H" shaped structures and the plurality of second "H" shaped structures to a corresponding one of the plurality of scanning lines and the plurality of data lines at a corresponding segment where a defect is detected.

The method may further have the step of providing a plurality of "+" shaped structures, where each of the plurality of the "+" shaped structures is placed over a crossover and associated with two first "H" shaped structures and two second "H" shaped structures that are immediately adjacent to the corresponding crossover. Additionally, the method may also include the steps of laser welding one or more of the plurality of first "H" shaped structures, the plurality of second "H" shaped structures and the plurality of "+" shaped structures to a corresponding one of the plurality of scanning lines and the plurality of data lines at a corresponding segment or a corresponding crossover where a defect is detected In yet a further aspect, the present disclosure relates to a common repair structure for repairing scanning line defects in an LCD panel comprising a plurality of scanning lines arranged in a first direction, a plurality of data lines arranged crossing over the plurality of scanning lines in a second direction substantially interlaced (such as perpendicular) to the first direction, thereby defining a plurality of crossovers therebetween, and a plurality of pixels associated with the plurality of scanning lines and data lines. In one embodiment, a common repair structure comprises a plurality of "H" shaped structures, where each "H" shaped structure is placed over a corresponding segment of two neighboring scanning lines located between and associated with two neighboring pixels along the second direction. When a defect is detected in a scanning line in the corresponding segment, the "H" shaped structure placed in the corresponding segment is electrically connected to the defected scanning line by laser welding. In one embodiment, the common repair structure may further comprises a plurality of bars, where each bar is placed over a corresponding crossover and associated with two "H" shaped structures in the second direction that are immediately adjacent to the corresponding crossover.

In an alternative aspect, the present disclosure relates to a common repair structure for repairing data line defects in an LCD panel comprising a plurality of scanning lines arranged in a first direction, a plurality of data lines arranged crossing over the plurality of scanning lines in a second direction substantially interlaced (perpendicular) to the first direction, thereby defining a plurality of crossovers therebetween, and a plurality of pixels associated with the plurality of scanning lines and data lines. In one embodiment, a common repair structure comprises a plurality of "H" shaped structures, where each "H" shaped structure is placed over a corresponding segment of two neighboring data lines located between and associated with two neighboring pixels along the first direction. When a defect is detected in a data line in the corresponding segment, the "H" shaped structure placed in the corresponding segment is electrically connected to the defected data line by laser welding. In one embodiment, the common repair structure may further comprises a plurality of bars, where each bar is placed over a corresponding crossover and associated with two "H" shaped structures in the first direction that are immediately adjacent to the corresponding crossover.

These and other aspects of the present disclosure will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein.

DETAILED DESCRIPTION OF THE DISCLOSURE

Figure 1:
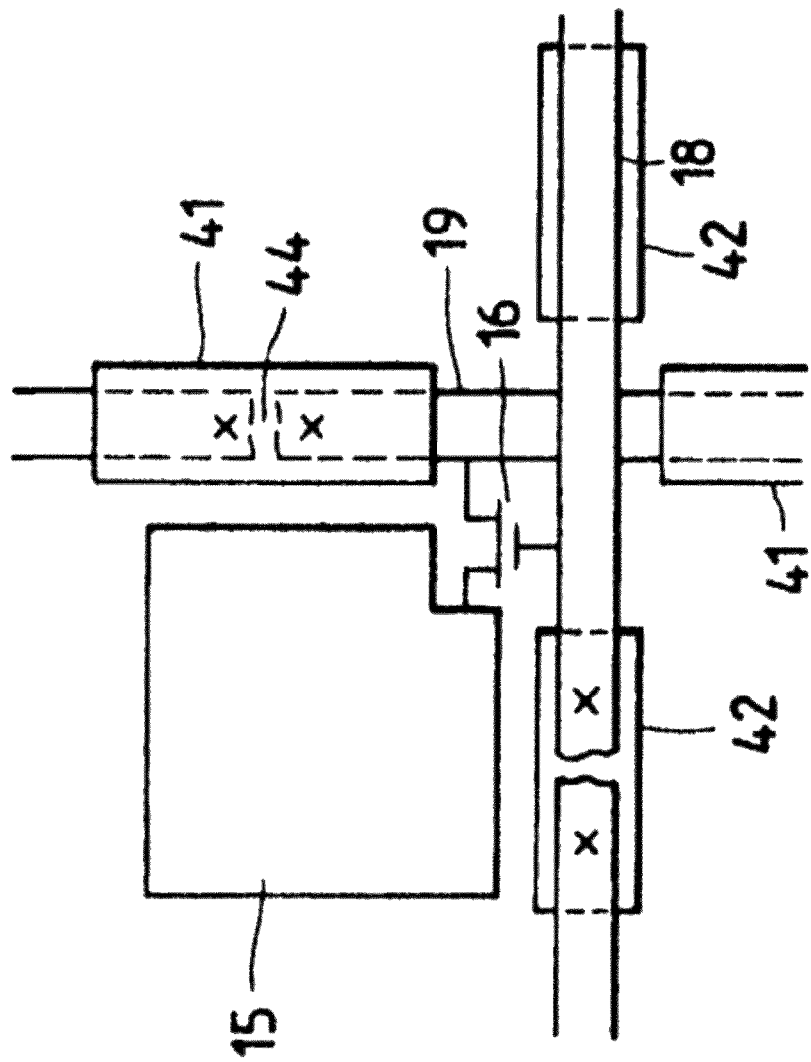
FIG. 1 shows a conventional repair structure to repair a scanning line defect and a data line defect.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising," "including," "having," "containing," "involving," and the like are to be understood to be open-ended, i.e., to mean including but not limited to.

The description will be made as to the embodiments of the present disclosure in conjunction with the accompanying drawings in FIGS. 2-11. In accordance with the purposes of this disclosure, as embodied and broadly described herein, this disclosure, in one aspect, relates to a common repair structure for repairing scanning line and/or data line defects in an LCD panel.

Figure 2:
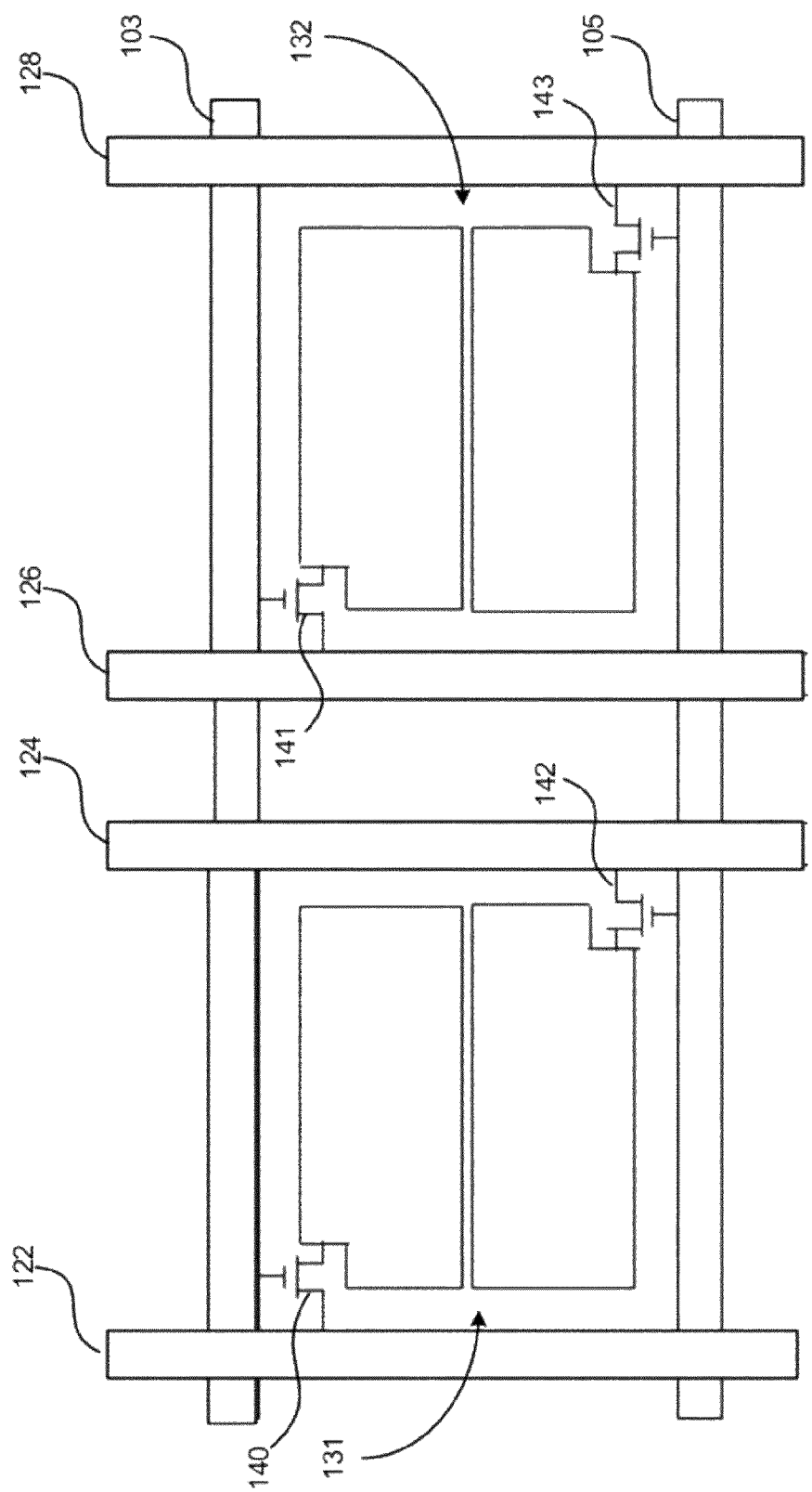
FIG. 2 shows schematically an LCD panel having a plurality of scanning lines arranged horizontally and a plurality of data lines arranged vertically, with display electrodes embedded in the space defined between the neighboring scanning lines and the neighboring data lines.
Figure 3:
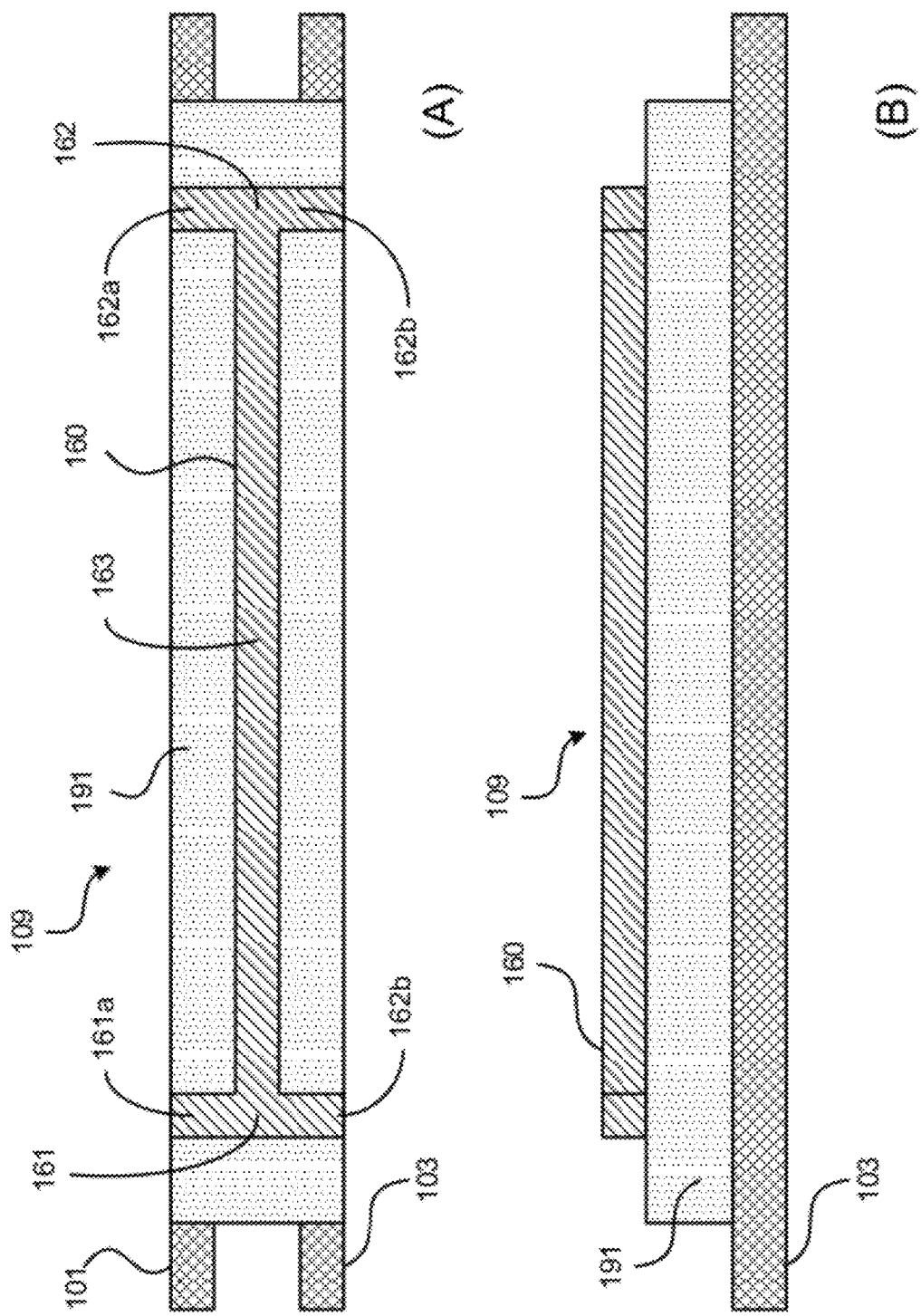
FIG. 3A illustrates schematically a top view of an "H"-shaped repairing structure for repairing a scanning line defect according to one embodiment of the present disclosure.
FIG. 3B illustrates schematically a side view of the "H"-shaped repairing structure for repairing a scanning line defect, as shown in FIG. 3A.
Figure 4:
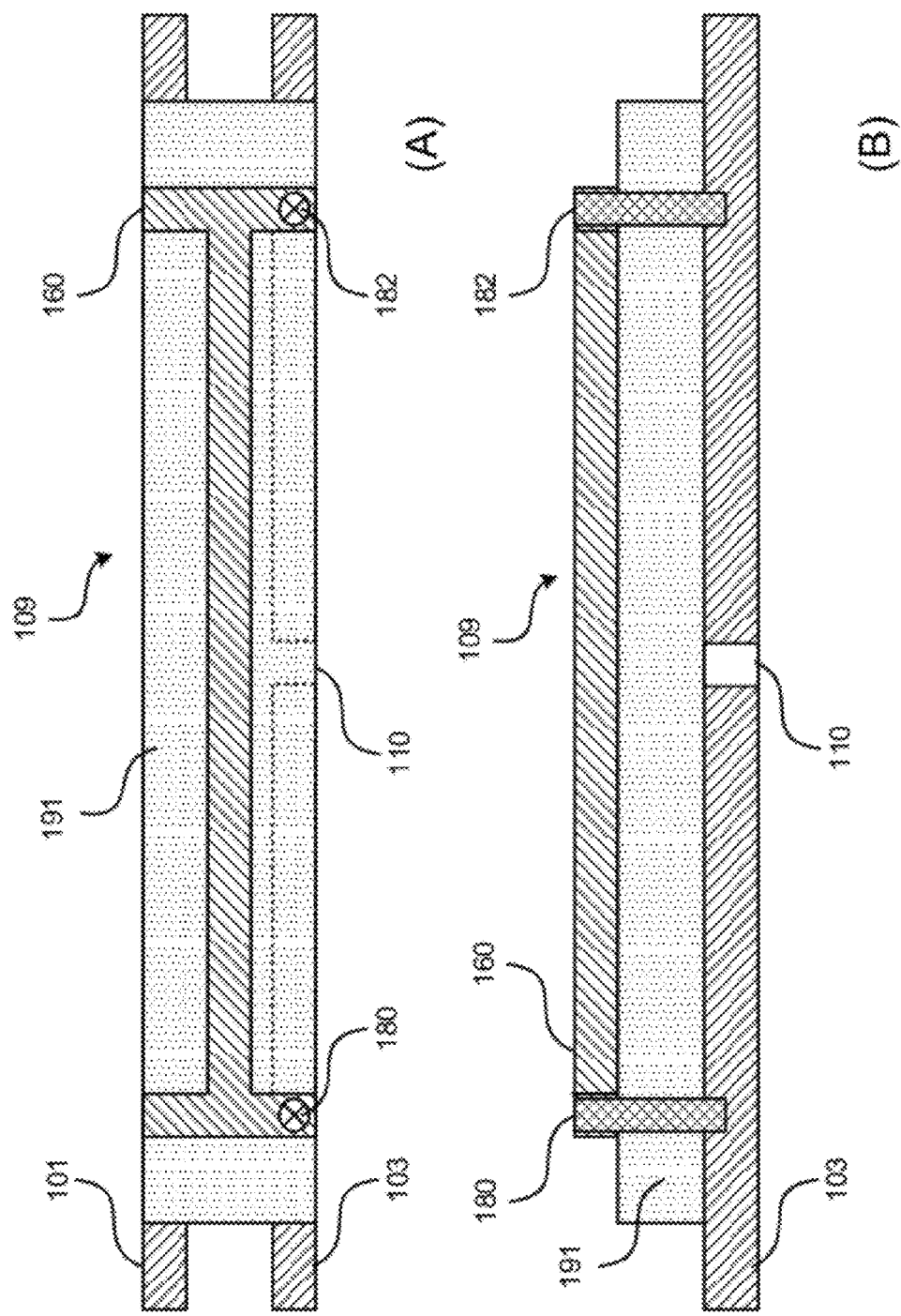
FIG. 4A illustrates schematically a top view of the "H"-shaped repairing structure that has repaired the scanning line defect, according to one embodiment of the present disclosure.
FIG. 4B illustrates schematically a side view of the "H"-shaped repairing structure that has repaired the scanning line defect, as shown in FIG. 4A.

FIG. 2 shows a layout of such an LCD panel. The basic structure of the LCD panel has (a) a plurality of scanning lines 103, 105, . . . , arranged in a first direction, (b) a plurality of data lines 122, 124, 126, 128, . . . , arranged in a second direction substantially interlaced (such as perpendicular) to the first direction, (c) a plurality of crossovers of the plurality of the data lines 122, 124, 126, 128, . . . , and the plurality of scanning lines 103, 105, . . . , (d) a plurality of pixels 131, 132, . . . , arranged in a matrix form in the spaces between the plurality of data lines 122, 124, 126, 128, . . . , and the plurality of scanning lines 103, 105, . . . , and (e) a plurality of thin film transistors (TFTs) 140, 141, 142, 143, . . . , electrically coupled to the corresponding data lines and scanning lines for displaying an image.

Referring now to FIGS. 3A and 3B, top and side views of an "H"-shaped repairing structure for repairing a defect in an exemplary scanning line is schematically shown, respectively, according to one embodiment of the present disclosure. The same configuration is also applied to a data line repair. The "H" shaped structure 160 has a first strip 161, a second strip 162, and a third strip 163 connected to and between the first and second strips 161 and 162. Each of the first and second strips 161/162 has a first end portion 161a/162a, and an opposite, second end portion 161b/162b. The "H" shaped structure 160 is placed over a corresponding segment 109 of two scanning lines 101 and 103 located between and associated with two pixels along the column (second) direction such that the first end portions 161a and 162a of the first and second strips 161 and 162 overlap with the scanning line 101, while the second end portions 161b and 162b of the first and second strips 161 and 162 overlap with the scanning lines 103. The "H" shaped structure 160 is connectable selectively to one of the two scanning lines 101 and 103 in the corresponding segment 109. Additionally, an insulating layer 191 is formed between the "H" shaped structure 160 and the scanning lines 101 and 103.

FIGS. 4A and 4B schematically show the top and side views of the "H"-shaped repairing structure 160 that has repaired a defect 110 in the exemplary scanning line 103, respectively.

As shown in FIGS. 3A, 3B, 4A and 4B, a defect repairing structure includes an "H" shaped repairing structure 160, and an insulating layer 191 between the scanning lines 101 and 103 and the "H" shaped repairing structure 160. Under normal condition when no defect on data lines or scanning lines is detected, then the insulating layer 191 prevents the scanning lines 101 and 103 from electrically coupled to the "H" shaped repairing structure 160.

When a defect (open circuit) 110 is detected on the scanning line 103, for example, as shown in FIG. 4B, a laser welding equipment (not shown) is used to create two electrical connecting points 180 and 182 penetrating the insulating layer 191, as shown in FIGS. 4A and 4B, according to one embodiment of the present disclosure. The open circuit defect 110 is repaired so that the scanning line 103 can perform its functions properly. If the other scanning line 101 has an open circuit defect, it can also be repaired in the similar fashion.

Due to the specific shapes and relative spatial relationship of the scanning lines and the "H" shaped repairing structures, the parasitic capacitance can be dramatically reduced.

Figure 5:
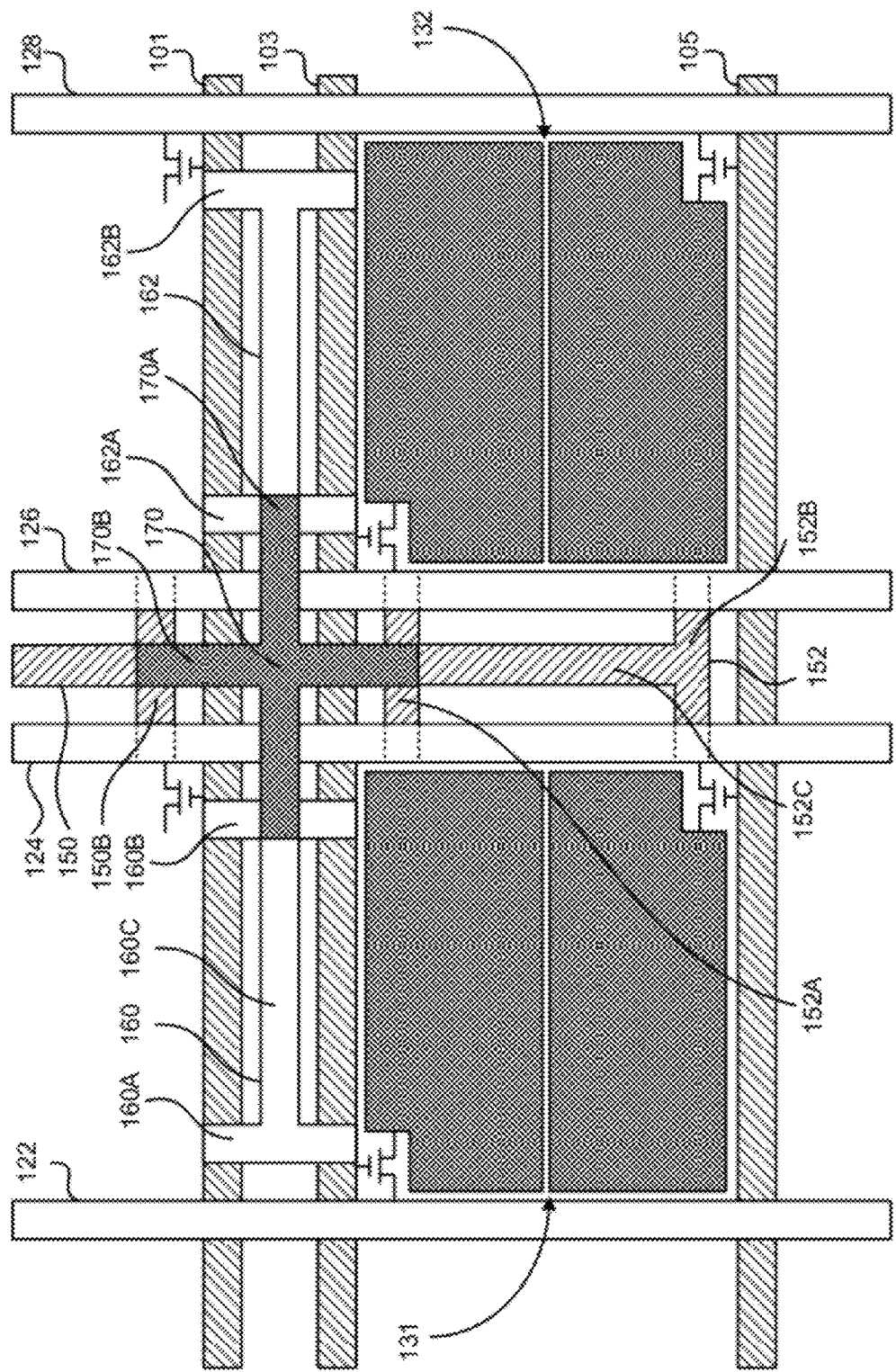
FIG. 5 shows schematically a common repair structure for repairing defects on data lines, scanning lines, and scanning lines and data lines crossover according to one embodiment of the present disclosure.

Referring now to FIG. 5, the common repair structure for repairing defects on the data lines, scanning lines, and crossover of the scanning lines and the data lines in an LCD panel in shown according to one embodiment of the present disclosure.

The basic structure of the LCD panel includes (a) a plurality of scanning lines 101 103, 105 . . . , arranged in a first direction, (b) a plurality of data lines 122, 124, 126, 128, . . . , arranged in a second direction substantially interlaced (such as perpendicular) to the first direction, (c) a plurality of crossovers of the plurality of the data lines 122, 124, 126, 128, . . . , and the plurality of scanning lines 101, 103, 105, . . . , (d) a plurality of pixels 131, 132, . . . , arranged in a matrix form in the spaces between the plurality of data lines 122, 124, 126, 128, . . . , and the plurality of scanning lines 101. 103, 105, . . . , electrically coupled to the data lines and scanning lines for displaying an image.

The common repair structure includes: (a) a plurality of first "H" shaped repairing structures 150, 152, . . . , (b) a plurality of second "H" shaped repairing structures 160, 162, . . . , and (c) a plurality of "+" shaped repairing structures 170. The plurality of first "H" shaped structures and the plurality of second "H" shaped structures are identical.

For the purpose of illustration of the present disclosure, in the exemplary embodiment shown in FIG. 5, the LCD includes only three scanning lines 101, 103 and 105, four data lines 122, 124, 126 and 128, two pixels 131 and 132 associated with the scanning lines 103 and 105, and the data lines 122, 124, 126 and 128. The common repair structure includes two first "H" shaped repairing structures 150 and 152, two second "H" shaped repairing structures 160 and 162, and one "+" shaped repairing structures 170. It would be appreciated to the people skilled in the art that the LCD may include any numbers of the scanning lines, data lines, and pixels, and the common repair structure may include any numbers of the first "H" shaped repairing structures, second "H" shaped repairing structures, and "+" shaped repairing structures.

As shown in FIG. 5, each first "H" shaped repairing structure 160/162 is placed over a corresponding segment of two neighboring scanning lines 101 and 103 located between and associated with two neighboring pixels along the second direction. Each second "H" shaped repairing structures 150/152 is placed over a corresponding segment of two neighboring data lines 124 and 126 located between and associated with two neighboring pixels along the first direction. The "+" shaped repairing structures 170 is placed over a corresponding crossover and associated with two first "H" shaped structures 150 and 152 and two second "H" shaped structures 160 and 162 that are immediately adjacent to the corresponding crossover.

When a defect is detected in a scanning line in the corresponding segment, the first "H" shaped structure is electrically connected to the defected scanning line in the corresponding segment by laser welding. When a defect is detected in a data line in the corresponding segment, the second "H" shaped structure is electrically connected to the defected data line in the corresponding segment by laser welding. When a defect is detected in a scanning line in the corresponding crossover, the "+" shaped structure is electrically connected to the defected scanning line in the corresponding crossover by laser welding the "+" shaped structure to the two first "H" shaped structures that are immediately adjacent to the corresponding crossover. When a defect is detected in a data line in the corresponding crossover, the "+" shaped structure is electrically connected to the defected data line in the corresponding crossover by laser welding the "+" shaped structure to the two second "H" shaped structures that are immediately adjacent to the corresponding crossover.

The plurality of first "H" shaped repairing structures, the plurality of second "H" shaped repairing structures, and the plurality of "+" shaped repairing structures are made of an electrically conductive material. Preferably, the electrically conductive material includes a laser weldable material.

In the exemplary embodiment, a first vertical bar (strip) 160A of the first "H" shaped repairing structure 160 is placed in close proximity of a first crossover of the data line 122 and the scanning lines 101 and 103. A second vertical bar (strip) 160B of the first "H" shaped repairing structure 160 is placed in close proximity of a second crossover of the data lines 124 and the scanning lines 101 and 103. The horizontal bar (third strip) 160C of the first "H" shaped repairing structure 160 is placed between the scanning lines 101 and 103, and between the first crossover and the second crossover. The horizontal bar 160C of the first "H" shaped repairing structure 160 is electrically connected to the first vertical bar 160A and the second vertical bar 160B of the first "H" shaped repairing structure 160. The insulating layer 191 is formed between the first "H" shaped repairing structure 160 and the scanning lines 101 and 103.

Further, a first end of the first vertical bar 160A of the first "H" shaped repairing structure 160 is placed over the first scanning line 101. A second end of the first vertical bar 160A of the first "H" shaped repairing structure 160 is placed over the second scanning line 103. A first end of the second vertical bar 160B of the first "H" shaped repairing structure 160 is placed over the scanning line 101. A second end of the second vertical bar 160B of the first "H" shaped repairing structure 160 is placed over the scanning line 103. The horizontal bar 160C of the first "H" shaped repairing structure 160 is placed over and between the scanning lines 101 and 103.

Additionally, a first horizontal bar (strip) 152A of the second "H" shaped repairing structure 152 is placed in close proximity of a first crossover of the data lines 124 and 126 and the scanning line 103. The second horizontal bar (strip) 152B of the second "H" shaped repairing structure 152 is placed in close proximity of a second crossover of the data lines 124 and 126 and a neighboring scanning line 105. Accordingly, the vertical bar (third strip) 152C of the second "H" shaped repairing structure 152 is placed over and between the data lines 124 and 126, and between the first crossover and the second crossover and electrically coupled to the first horizontal bar 152A and the second horizontal bar 152B. An insulating layer (not shown) is formed between the second "H" shaped repairing structure 152 and the data lines 124 and 126.

Further, a first end of the first horizontal bar 152A of the second "H" shaped repairing structure 152 is placed over the data line 124. A second end of the first horizontal bar 152A of the second "H" shaped repairing structure 152 is placed over the data line 126. A first end of the second horizontal bar 152B of the second "H" shaped repairing structure 152 is placed over the data line 124. A second end of the first horizontal bar 152B of the second "H" shaped repairing structure 152 is placed over the data line 126.

Moreover, a first end of the horizontal bar (strip) 170A of the "+" shaped repairing structure 170 is placed over a second vertical bar 160B of the first "H" shaped repairing structure 160. A second end of the horizontal bar (strip) 170A of the "+" shaped repairing structure 170 is placed over a first vertical bar 162A of a neighboring first "H" shaped repairing structure 162. A first end of the vertical bar 170B of the "+" shaped repairing structure 170 is placed over a second horizontal bar 150B of a second "H" shaped repairing structure 150. A second end of the vertical bar 170B of the "+" shaped repairing structure 170 is placed over a first horizontal bar 152A of a neighboring second "H" shaped repairing structure 152. An insulating layer (not shown) is placed between the "+" shaped repairing structure 170, the first "H" shaped repairing structure 160, and a neighboring first "H" shaped repairing structure 162.

Without intent to limit the scope of the disclosure, exemplary repairing structures and processes according to the embodiments of the present disclosure are given below.

1. Open Circuit Defect on a Data Line

Figure 6:
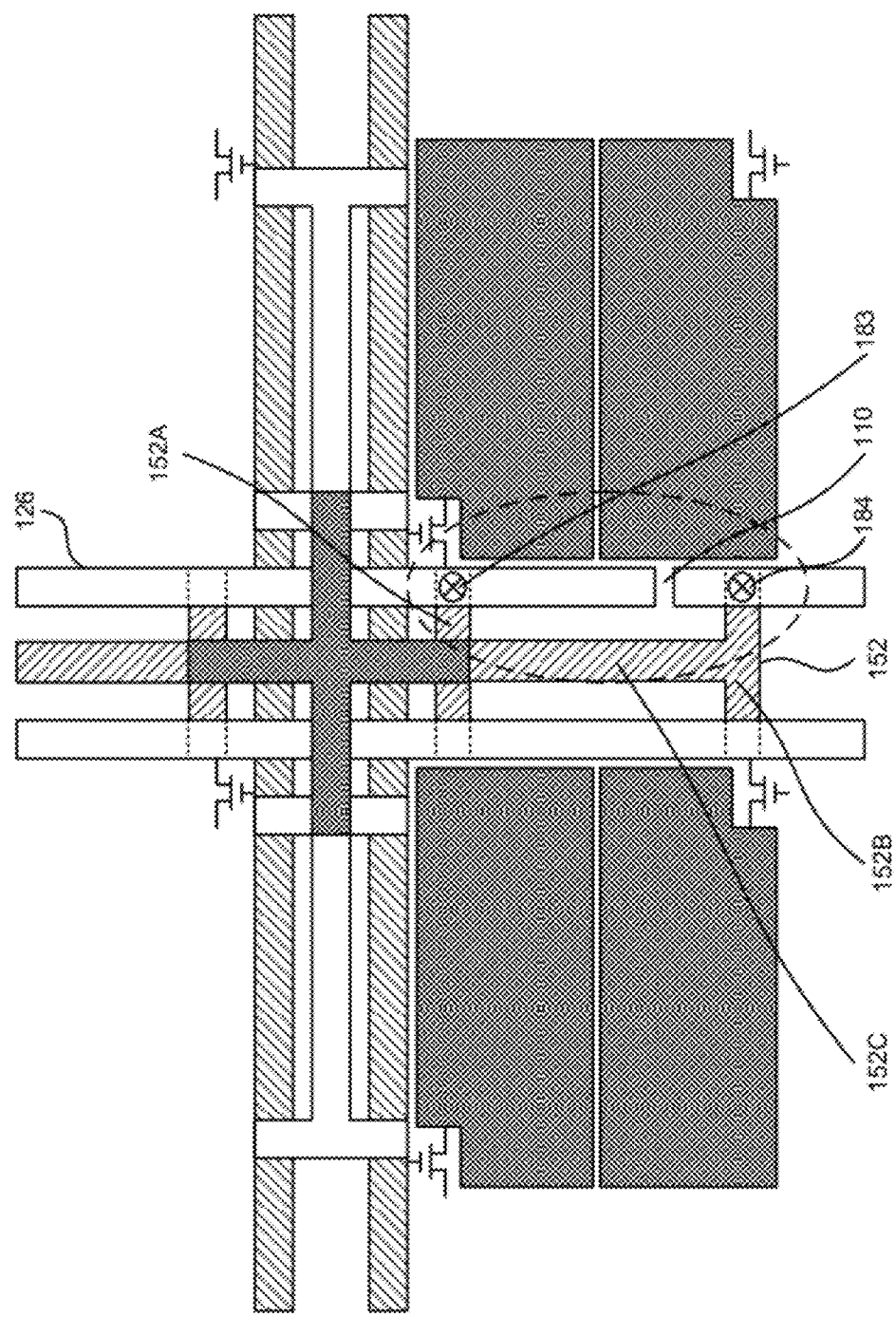
FIG. 6 shows schematically repairing processes for repairing an open circuit defect in a data line according to one embodiment of the present disclosure.

FIG. 6 shows schematically the details of repairing an open circuit defect 110 on a data line 126 according to one embodiment of the present disclosure. An open circuit defect 110 is detected on the data line 126. In order to repair such a defect, a second "H" shaped repairing structure 152 is used. One end of the first horizontal bar 152A of the second "H" shaped repairing structure 152 over the data line 126 is used as a first welding point 183, and one end of the second horizontal bar 152B of the second "H" shaped repairing structure 152 over the data line 126 is used as a second welding point 184, respectively. Once the laser welding is completed, both ends of the open circuit 110 is completed with the connection made by the welding points 180 and 182 through 152A, 152B, and 152C of the second "H" shaped repairing structure 152. The open circuit 110 of the data line 126 is repaired accordingly.

2. Open Circuit Defect on a Scanning Line

Figure 7:
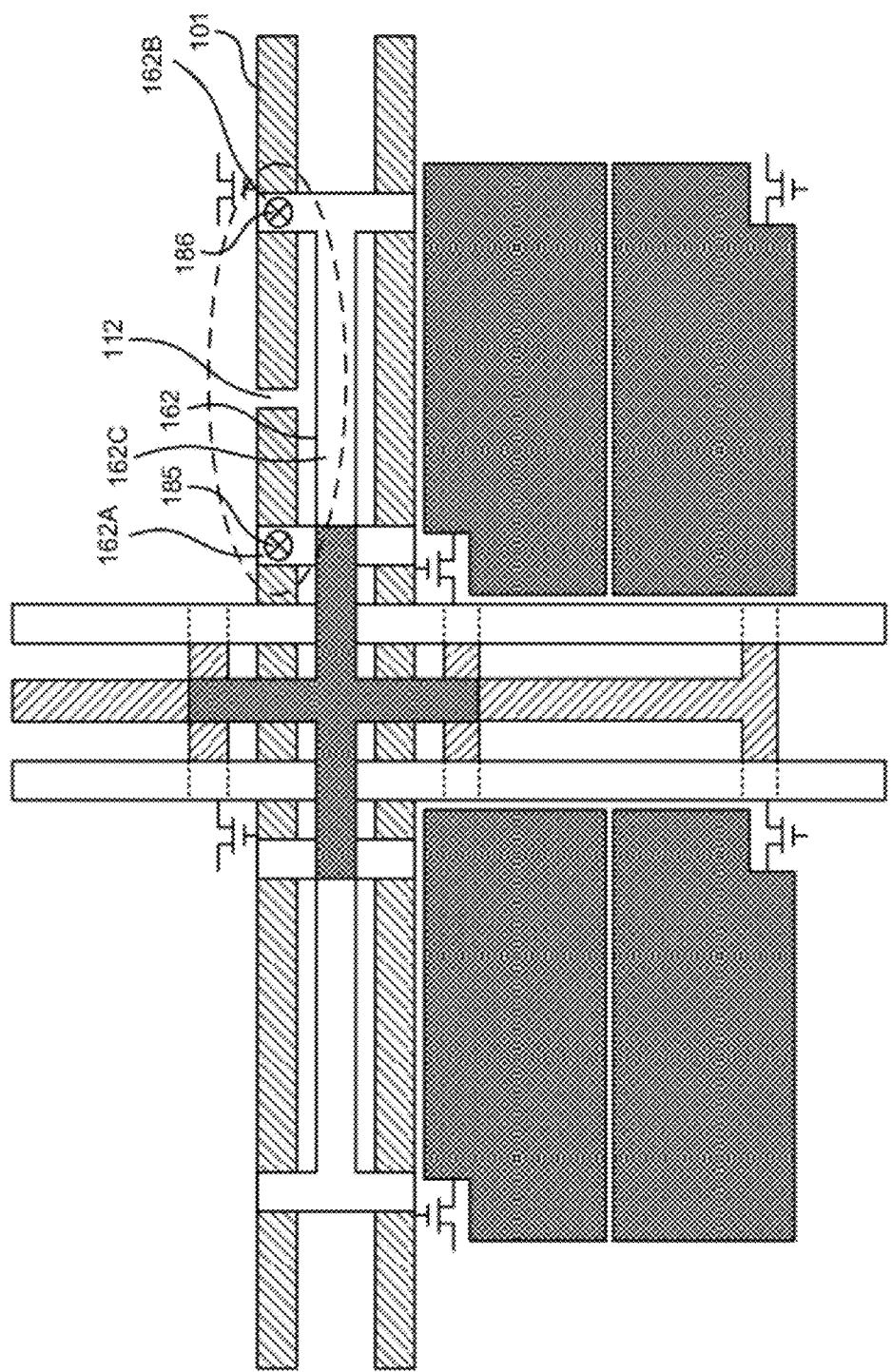
FIG. 7 shows schematically repairing processes for repairing an open circuit defect in a scanning line according to one embodiment of the present disclosure.

FIG. 7 shows schematically the details of repairing an open circuit defect on a scanning line 101 according to one embodiment of the present disclosure. An open circuit defect 112 is detected on the scanning line 101. In order to repair such a defect, a first "H" shaped repairing structure 162 is used. One end of the first vertical bar 162A of the first "H" shaped repairing structure 162 over the scanning line 101 is used as a first welding point 185, and one end of the second vertical bar 162B of the first "H" shaped repairing structure 162 over the scanning line 101 is used as a second welding point 186, respectively. Once the laser welding is completed, both ends of the open circuit 112 is completed with the connection made by the welding points 185 and 186 through 162A, 162C, and 162B of the first "H" shaped repairing structure 162. The open circuit defect 112 of the scanning line 101 is repaired.

3. Short Circuit Defect Between a Data Line and a Scanning Line

Figure 8:
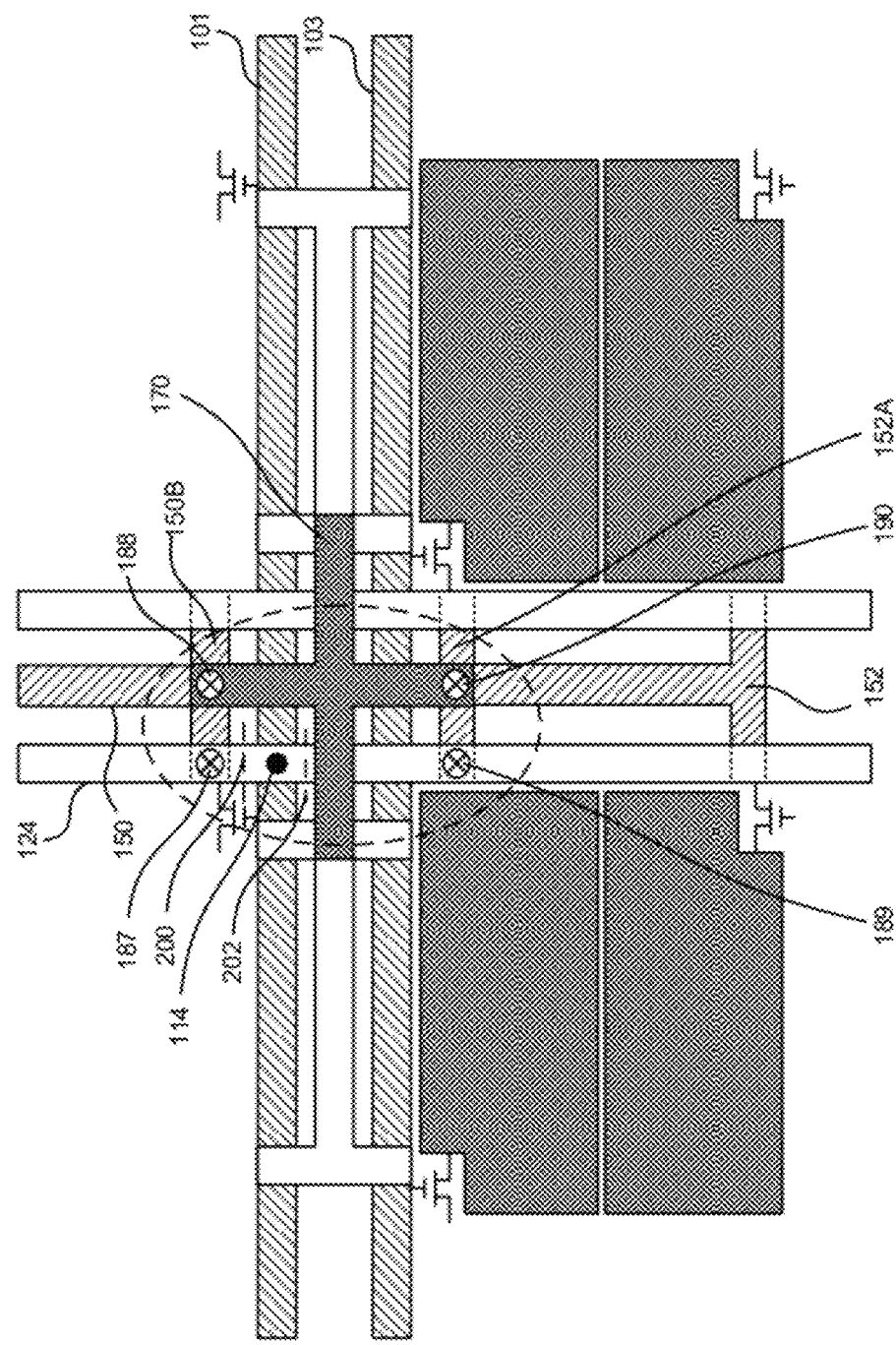
FIG. 8 shows schematically repairing processes for repairing a short circuit defect between data line and scanning line at a crossover of a data line and scanning line, according to one embodiment of the present disclosure.

FIG. 8 shows schematically the details of repairing a short circuit defect between the data line 124 and the scanning line 101 at a crossover of the data line 124 and the scanning line 101, according to one embodiment of the present disclosure. A short circuit defect 114 between the data line 124 and the scanning line 101 is detected. In order to repair such a defect, two first "H" shaped repairing structures 150 and 152, and one "+" shaped repairing structure 170 are used. One end of the second horizontal bar 150B of the second "H" shaped repairing structure 150 over the data line 124 is used as a first welding point 187. The top end of the vertical bar of the "+" shaped repairing structure 170 over the center portion of the second horizontal bar 150B is used as a second welding point 188. One end of the first horizontal bar 152A of the second "H" shaped repairing structure 152 over the data line 124 is used as a third welding point 189. The bottom end of the vertical bar of the "+" shaped repairing structure 170 over the center portion of the first horizontal bar 152A is used as a fourth welding point 190. In addition to the laser welding, two circuit cuts 200 and 202 must be made to repair the short circuit defect. Once the laser welding is completed and the cuts are made, the short circuit 114 is completed with the connection made by the welding point 187, 188, 189 and 190 through the second horizontal bar 150B of the "H" shaped repairing structure 150, the vertical bar of the "+" shaped repairing structure 170, and the first horizontal bar 152A of another "H" shaped repairing structure 152. The short circuit defect 114 between the data line 124 and the scanning line 101 at the crossover is repaired.

Figure 9:
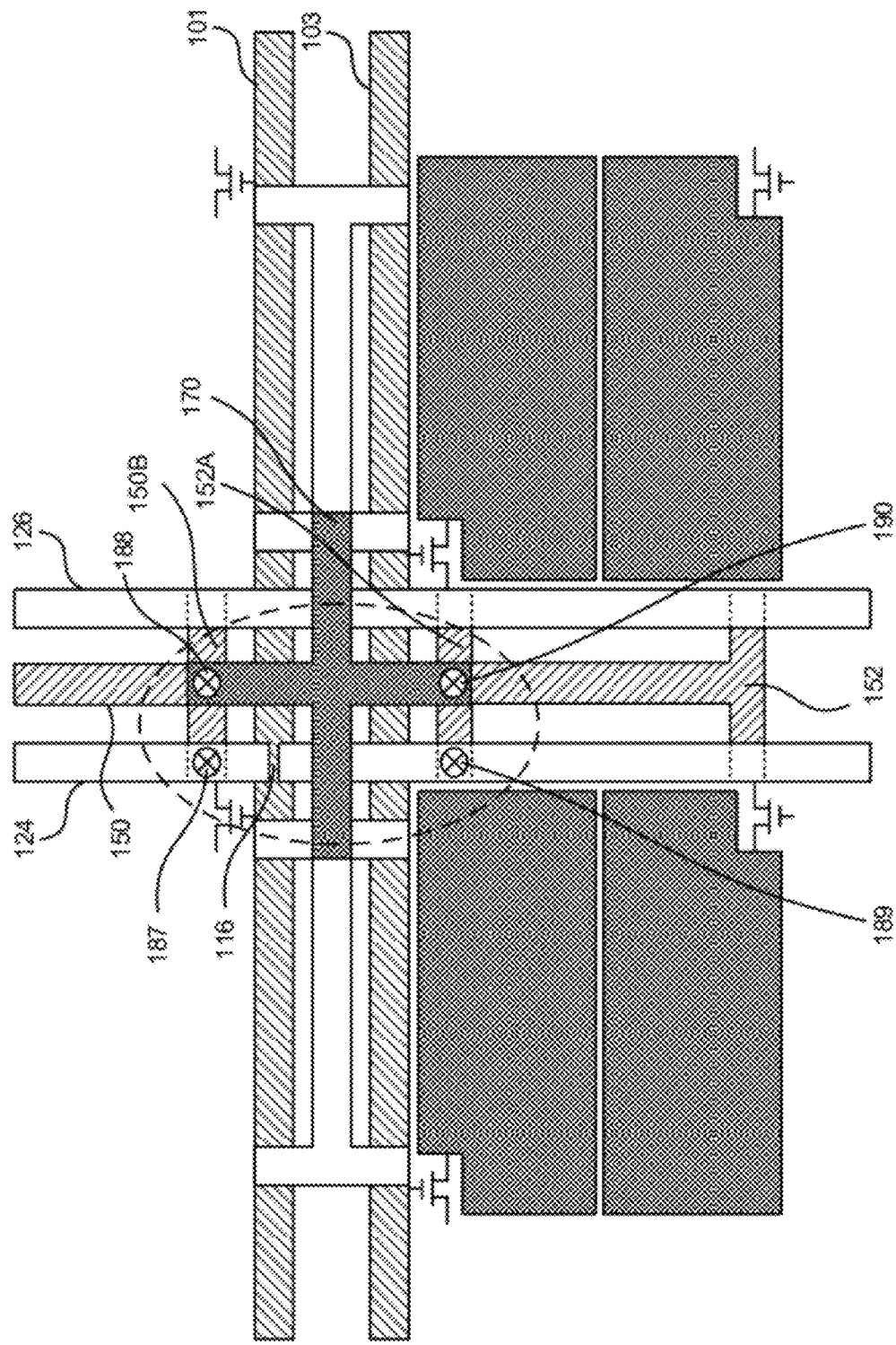
FIG. 9 shows schematically repairing processes for repairing an open circuit defect in a data line at the crossover of a data line and a scanning line according to one embodiment of the present disclosure.

4. Open Circuit Defect on a Data Line at a Crossover of the Data Line and a Scanning Line FIG. 9 shows schematically the details of repairing an open circuit defect on a data line 124 at a crossover of the data line 124 and the scanning line 101 according to one embodiment of the present disclosure. An open circuit defect 116 on the data line 124 at the crossover of the data line 124 and the scanning line 101 is detected. Since it occurs at a place beyond the repair stretch of either a second "H" shaped repairing structure 150 and a neighboring second "H" shaped repairing structure 152, it must be repaired with a combination of the two first "H" shaped repairing structures 150 and 152, and a "+" shaped repairing structure 170. Specifically, one end of the second horizontal bar 150B of the second "H" shaped repairing structure 150 over the data line 124 is used as a first welding point 187. The top end of the vertical bar of the "+" shaped repairing structure 170 over the center portion of the second horizontal bar 150B is used as a second welding point 188. One end of the first horizontal bar 152A of the second "H" shaped repairing structure 152 over the data line 124 is used as a third welding point 189. The bottom end of the vertical bar of the "+" shaped repairing structure 170 over the center portion of the first horizontal bar 152A is used as a fourth welding point 190. Once the laser welding is completed, the open circuit 116 is completed with the connection made by the welding point 187, 188, 189 and 190 through the second horizontal bar 150B of the "H" shaped repairing structure 150, the vertical bar of "+" shaped repairing structure 170, and the first horizontal bar 152A of another "H" shaped repairing structure 152. The open circuit defect 116 between the data line 124 and the scanning line 101 at a crossover of the data line 124 and the scanning line 101 is repaired.

Figure 10:
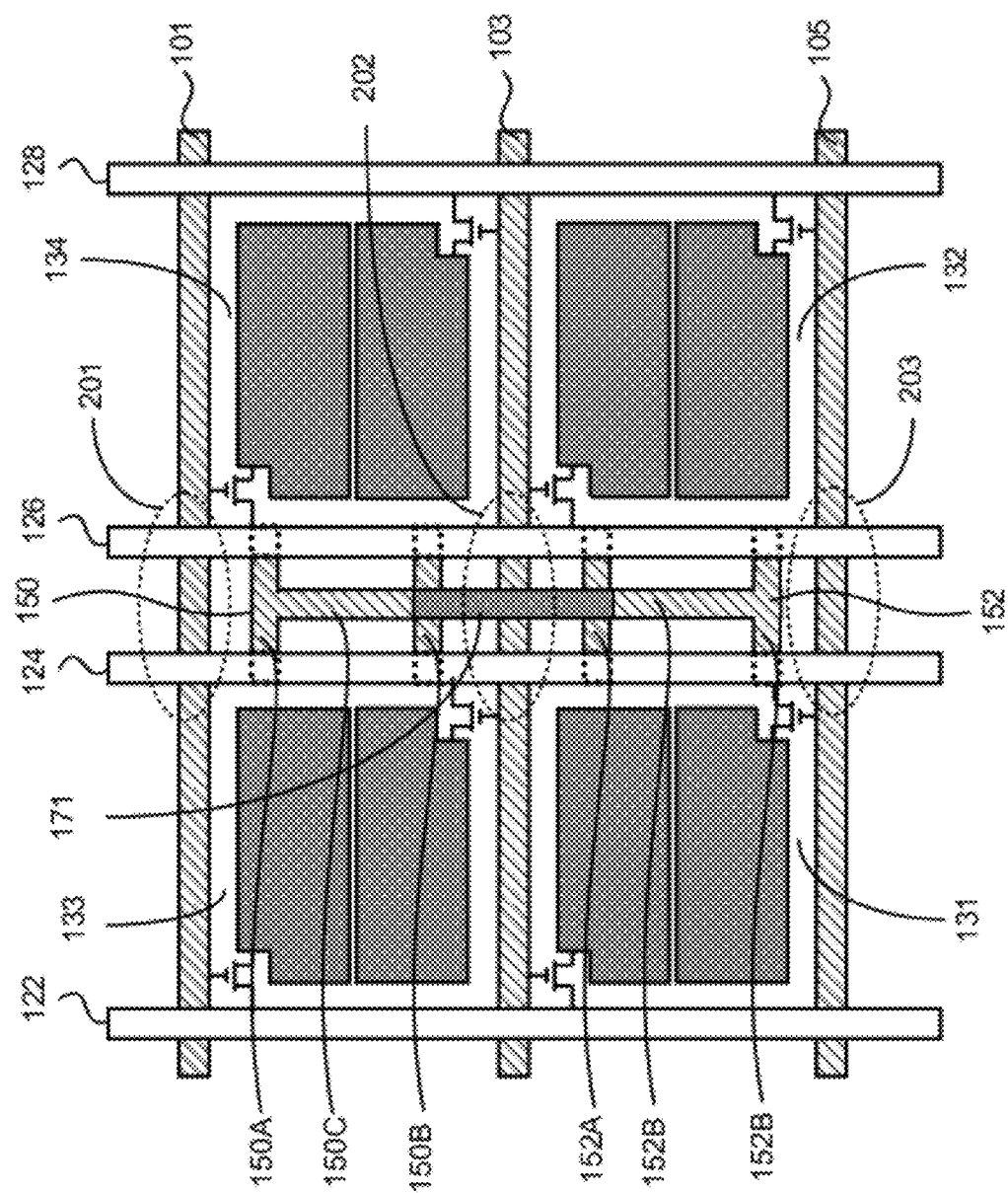
FIG. 10 shows schematically a common repair structure for repairing defects on scanning lines according to one embodiment of the present disclosure.

Referring to FIG. 10, a common repair structure for repairing data line defects in an LCD panel is shown according to one embodiment of the present disclosure. The LCD panel includes a plurality of scanning lines spatially arranged in a first direction, a plurality of data lines spatially arranged crossing over the plurality of scanning lines in a second direction substantially interlaced (such as perpendicular) to the first direction, and a plurality of pixels associated with the plurality of scanning lines and data lines and arranged in a matrix form such that two data lines are located between two neighboring pixels in the first direction and one scanning line is located between two neighboring pixels in the second direction.

For the purpose of illustration of the present disclosure, in the exemplary embodiment shown in FIG. 10, the LCD includes only three scanning lines 101, 103 and 105, and four data lines 122, 124, 126 and 128, four pixels 131, 132, 133 and 134 arranged such that the data lines 124 and 126 are located between two neighboring pixels 131 and 132 (or 133 and 134) in the second direction, and the scanning line 103 is located between two neighboring pixels 133 and 131 (or 134 and 132) in the first direction. The common repair structure includes two "H" shaped repairing structures 150 and 152, and may further comprise one bar 171. It would be appreciated to the people skilled in the art that the LCD may include any numbers of the scanning lines, data lines, and pixels, and the common repair structure may include any numbers of the "H" shaped repairing structures and bars. The common repair structure may include any numbers of the "H" shaped repairing structures and bars is insulated from the scanning lines and data lines.

As shown in FIG. 10, each "H" shaped repairing structure 150/152 is placed over a corresponding segment of two neighboring data lines 124 and 126 located between and associated with two neighboring pixels 131 and 132 (or 133 and 134) along the second direction. Specifically, a first horizontal bar (strip) 150A of the "H" shaped repairing structure 150 is placed in close proximity of a first crossover 201 defined with the scanning line 101 and the data lines 124 and 126. A second horizontal bar (strip) 150B of the "H" shaped repairing structure 150 is placed in close proximity of a second crossover 202 defined with the scanning line 103 and the data lines 124 and 126. The vertical bar (third strip) 150C of the "H" shaped repairing structure 150 is placed between the data lines 124 and 126, and between the first crossover 201 and the second crossover 202. The vertical bar 150C of the "H" shaped repairing structure 150 is electrically connected to the first and second horizontal bars 150A and 150B of the "H" shaped repairing structure 150. Further, the first and second ends of the first horizontal bar 150A of the "H" shaped repairing structure 150 are placed over the data lines 124 and 126, respectively. The first and second ends of the second horizontal bar 150B of the "H" shaped repairing structure 150 are placed over the data lines 124 and 126, respectively.

Similarly, a first horizontal bar (strip) 152A of the "H" shaped repairing structure 152 is placed in close proximity of the second crossover 202. A second horizontal bar (strip) 152B of the "H" shaped repairing structure 152 is placed in close proximity of a third crossover 203 defined with the scanning line 105 and the data lines 124 and 126. The vertical bar (third strip) 152C of the "H" shaped repairing structure 152 is placed between the data lines 124 and 126, and between the third crossover 203 and the second crossover 202. The vertical bar 152C of the "H" shaped repairing structure 152 is electrically connected to the first and second horizontal bars 152A and 152B of the "H" shaped repairing structure 152. Further, the first and second ends of the first horizontal bar 152A of the "H" shaped repairing structure 152 are placed over the data lines 124 and 126, respectively. The first and second ends of the second horizontal bar 152B of the "H" shaped repairing structure 152 are placed over the data lines 124 and 126, respectively.

Additionally, an insulating layer (not shown) is formed between the "H" shaped repairing structures 150/152 and the data lines 124 and 126.

Referring the foregoing discussion, such an arrangement can be effectively utilized to repair a defect detected in the data line 124 or 126 in the corresponding segment between the first and second crossovers or between the second and third crossovers, or detected in the second crossover.

Figure 11:
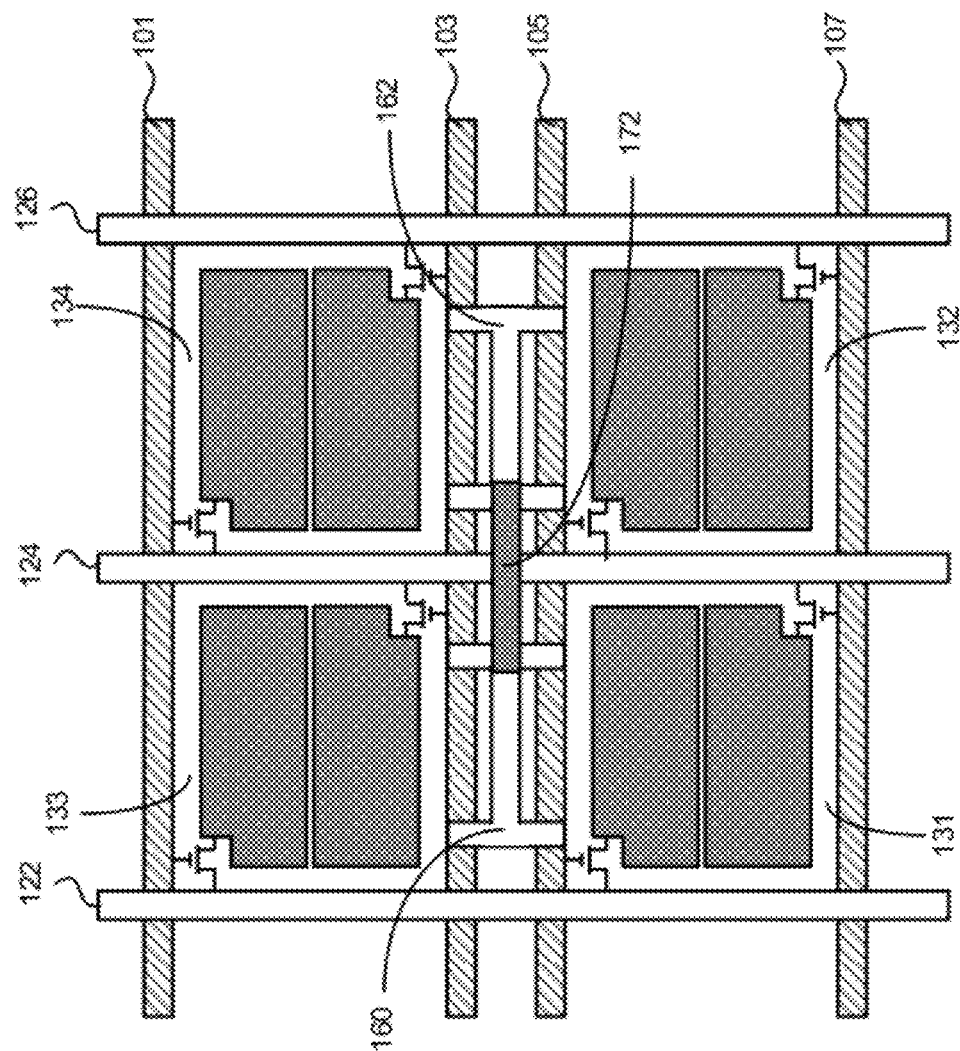
FIG. 11 shows schematically a common repair structure for repairing defects on data lines according to one embodiment of the present disclosure.

FIG. 11 shows another embodiment of a common repair structure for repairing scanning line defects in an LCD panel including a plurality of scanning lines 101, 103, 105, 107, . . . , spatially arranged in a first direction, a plurality of data lines 122, 124, 126, . . . , spatially arranged crossing over the plurality of scanning lines 101, 103, 105, 107, . . . in a second direction substantially interlaced (such as perpendicular) to the first direction, and a plurality of pixels associated with the plurality of scanning lines 101, 103, 105, 107, . . . , and data lines 122, 124, 126, . . . , and arranged in a matrix form such that two scanning lines are located between two neighboring pixels in the first direction and one data line is located between two neighboring pixels in the second direction.

For the purpose of illustration of the present disclosure, in the exemplary embodiment shown in FIG. 11, the LCD includes only four scanning lines 101, 103, 105 and 107, and three data lines 122, 124 and 126, four pixels 131, 132, 133 and 134 arranged such that the scanning lines 103 and 105 are located between two neighboring pixels 133 and 131 (or 134 and 132) in the first direction, and the data line 124 is located between two neighboring pixels 131 and 132 (or 133 and 134) in the second direction. The common repair structure includes two "H" shaped repairing structures 160 and 162, and may further comprise one bar 172.

Similarly, such an arrangement can be effectively utilized to repair a defect detected in the scanning line 103 or 105 in the corresponding segment or detected in a crossover defined with the scanning lines 103 and 105 and the data line 124.

In another aspect, the present disclosure relates to a method for repairing scanning line and/or data line defects in an LCD panel, as disclosed above.

The method, in one embodiment, includes the steps of (a) providing a plurality of first "H" shaped structures, where each of the first "H" shaped structures is placed over a corresponding segment of two neighboring scanning lines located between and associated with two neighboring pixels along the second direction; (b) providing a plurality of second "H" shaped structures, where each of the first "H" shaped structures is placed over a corresponding segment of two neighboring data lines located between and associated with two neighboring pixels along the first direction; (c) detecting a defect in a segment; and (d) laser welding one of plurality of first "H" shaped structures and the plurality of second "H" shaped structures, to the defected scanning and/or data lines where the defects are detected. Further, when the defect is detected in the crossover, the method may include the step of providing a plurality of "+" shaped structures, where each of the plurality of the "+" shaped structures is placed over a corresponding crossover and associated with two first "H" shaped structures and two second "H" shaped structures that are immediately adjacent to the corresponding crossover for repairing a scanning line and/or data line defect around the crossover.

According to the present disclosure, the use of thee repairing structures can drastically reduce the coupling capacitance. Additionally, it is much easier to locate the repair point.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A common repair structure for repairing data line defects in a liquid crystal display (LCD) panel, wherein the LCD panel comprises a plurality of scanning lines arranged in a first direction, a plurality of data lines arranged crossing over the plurality of scanning lines in a second direction substantially interlaced to the first direction, thereby defining a plurality of crossovers therebetween, and a plurality of pixels associated with the plurality of scanning lines and data lines, comprising:

a plurality of "H" shaped structures, each "H" shaped structure being not connected to the other "H" shaped structures, wherein each "H" shaped structure is placed over a corresponding segment of two neighboring data lines located between and associated with two neighboring pixels along the first direction.

2. The common repair structure of claim 1, wherein when a defect is detected in a data line in the corresponding segment, the "H" shaped structure placed in the corresponding segment is electrically connected to the defected data line by laser welding.

3. The common repair structure of claim 1, further comprising a plurality of bars, wherein each bar is placed over a corresponding crossover and associated with two "H" shaped structures in the second direction that are immediately adjacent to the corresponding crossover.

* * * * *